US009125203B2

(12) United States Patent
Zuniga et al.

(10) Patent No.: US 9,125,203 B2
(45) Date of Patent: Sep. 1, 2015

(54) METHOD AND APPARATUS FOR MANAGING WIRELESS COMMUNICATION NETWORK RADIO RESOURCES

(71) Applicant: InterDigital Technology Corporation, Wilmington, DE (US)

(72) Inventors: Juan Carlos Zuniga, Montreal (CA); Marian Rudolf, Montreal (CA); Shamim Akbar Rahman, Cote St. Luc (CA)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 14/283,596

(22) Filed: May 21, 2014

(65) Prior Publication Data

US 2014/0254572 A1    Sep. 11, 2014

Related U.S. Application Data

(63) Continuation of application No. 11/255,270, filed on Oct. 21, 2005, now Pat. No. 8,737,920.

(60) Provisional application No. 60/626,979, filed on Nov. 10, 2004.

(51) Int. Cl.
*H04B 15/00* (2006.01)
*H04B 1/04* (2006.01)
(Continued)

(52) U.S. Cl.
CPC .......... *H04W 72/0446* (2013.01); *H04W 24/02* (2013.01); *H04W 72/082* (2013.01); *H04W 84/18* (2013.01)

(58) Field of Classification Search
USPC ......................................... 455/448, 454, 63.1
See application file for complete search history.

(56) References Cited

U.S. PATENT DOCUMENTS

| 5,138,615 A | 8/1992 | Lamport et al. |
| 5,649,303 A * | 7/1997 | Hess et al. ................... 455/63.3 |

(Continued)

FOREIGN PATENT DOCUMENTS

| EP | 1 480 388 | 11/2004 |
| WO | 91/11868 | 8/1991 |

(Continued)

OTHER PUBLICATIONS

Agere et al., "Wireless Universal Serial Bus Specification," Revision 1.0 (May 12, 2005).

(Continued)

*Primary Examiner* — Joel Ajayi
(74) *Attorney, Agent, or Firm* — Volpe and Koenig, P.C.

(57) ABSTRACT

A method and apparatus for managing radio resources in one or more wireless communication networks. At least one radio resource manager (RRM) is provided within a network node, or as an independent entity. The RRM monitors performance on wireless communication links of the network(s) and interacts with nodes associated with those links to change the configuration on a particular wireless communication link if its performance (i.e., quality) falls below an established threshold. Information regarding current resource usage of the network is sent to the RRM by the nodes. Each of the nodes may send a quality report to the RRM including wireless communication link quality measurements and performance statistics. Alternatively, the RRM may perform the wireless communication link quality measurements. The RRM facilitates the broadcasting of information regarding current resource usage of one network to other networks to avoid collisions and interference.

16 Claims, 1 Drawing Sheet

(51) Int. Cl.
*H04B 1/10* (2006.01)
*H04W 72/04* (2009.01)
*H04W 24/02* (2009.01)
*H04W 72/08* (2009.01)
*H04W 84/18* (2009.01)

(56) References Cited

U.S. PATENT DOCUMENTS

| | | |
|---|---|---|
| 5,719,868 A | 2/1998 | Young |
| 6,047,175 A | 4/2000 | Trompower |
| 6,049,549 A | 4/2000 | Ganz et al. |
| 6,072,790 A | 6/2000 | Neumiller et al. |
| 6,434,380 B1 | 8/2002 | Andersson et al. |
| 6,473,398 B1 | 10/2002 | Wall et al. |
| 6,519,462 B1 | 2/2003 | Lu et al. |
| 6,600,726 B1 | 7/2003 | Nevo et al. |
| 6,675,012 B2 | 1/2004 | Gray |
| 6,768,715 B2 | 7/2004 | Hsu et al. |
| 6,804,532 B1 | 10/2004 | Moon et al. |
| 6,894,985 B2 | 5/2005 | Billhartz |
| 6,961,573 B1 | 11/2005 | Moon et al. |
| 7,158,796 B2 | 1/2007 | Tiedemann, Jr. et al. |
| 7,630,731 B2 | 12/2009 | Lundby et al. |
| 7,643,844 B2 | 1/2010 | Kwak et al. |
| 7,836,727 B2 | 11/2010 | Nishiyama |
| 2002/0028675 A1 | 3/2002 | Schmutz et al. |
| 2002/0060995 A1 | 5/2002 | Cervello et al. |
| 2002/0090938 A1 | 7/2002 | Dharia et al. |
| 2002/0159409 A1 | 10/2002 | Wolfe et al. |
| 2002/0159434 A1 | 10/2002 | Gosior et al. |
| 2002/0188723 A1 | 12/2002 | Choi et al. |
| 2003/0107512 A1 | 6/2003 | McFarland et al. |
| 2003/0108016 A1 | 6/2003 | Bonta |
| 2003/0169712 A1 | 9/2003 | Tsao |
| 2003/0191856 A1 | 10/2003 | Lewis et al. |
| 2003/0203740 A1 | 10/2003 | Bahl et al. |
| 2003/0214967 A1 | 11/2003 | Heberling |
| 2004/0022223 A1 | 2/2004 | Billhartz |
| 2004/0037247 A1 | 2/2004 | Ngo |
| 2004/0180701 A1 | 9/2004 | Livet et al. |
| 2004/0203623 A1 | 10/2004 | Wu |
| 2004/0203820 A1 | 10/2004 | Billhartz |
| 2005/0043047 A1 | 2/2005 | Vigier et al. |
| 2005/0053005 A1 | 3/2005 | Cain et al. |
| 2005/0076112 A1 | 4/2005 | Ravindran et al. |
| 2005/0169186 A1 | 8/2005 | Qiu et al. |
| 2005/0233700 A1 | 10/2005 | Pecen et al. |
| 2006/0098608 A1 | 5/2006 | Joshi |

FOREIGN PATENT DOCUMENTS

| | | |
|---|---|---|
| WO | 01/37508 | 5/2001 |
| WO | 02/058341 | 7/2002 |
| WO | 03/053079 | 6/2003 |
| WO | 2004/028030 | 4/2004 |
| WO | 2004/100425 | 11/2004 |
| WO | 2005/074212 | 8/2005 |
| WO | 2006/044836 | 4/2006 |

OTHER PUBLICATIONS

Apostolisk, "Radio Resource Management in Cellular Digital Packet Data Networks," IEEE Personal Communications, pp. 28-36 (Dec. 1999).

IEEE Wireless Lan Edition—A compilation based on IEEE Std. 802.11™—1999 (R2003) and its amendments, Sep. 19, 2003.

Mirhakkah et al. "Dynamic Quality-of-Service for Mobile Ad Hoc Networks;" 2000.

Raniwala et al., "Centralized Channel Assignment and Routing Algorithms for Multi-Channel Wireless Mesh Networks," Mobile Computing and Communications Review, vol. 8, No. 2, pp. 50-65 (Apr. 2004).

Salkintzis, "Leveraging Spatial Reuse in 802.11 Mesh Networks with Enhanced Physical Carrier Sensing;" IEEE Communications Society, 2004, pp. 4004-4011.

Sallent et al., "Using Measurements Extracted from GSM/UMTS Network for 3G Planning and RRM Evaluation," Wireless Communications and Networking, pp. 1448-1452 (Dec. 2003).

* cited by examiner

METHOD AND APPARATUS FOR MANAGING WIRELESS COMMUNICATION NETWORK RADIO RESOURCES

CROSS REFERENCE TO RELATED APPLICATION

This application is a continuation of U.S. patent application Ser. No. 11/255,270 filed Oct. 21, 2005, now U.S. Pat. No. 8,737,920 granted May 27, 2014, which claims the benefit of U.S. Provisional Patent Application No. 60/626,979 filed Nov. 10, 2004, which is incorporated by reference as if fully set forth.

FIELD OF INVENTION

The present invention relates to wireless communication networks. More particularly, the present invention relates to a method and apparatus for managing radio resources in one or more wireless communication networks.

BACKGROUND

A wireless access network comprises a plurality of nodes, such as access points (APs), (i.e., base stations), access routers and wireless transmit/receive unit (WTRU). The nodes are connected to each other to establish a backhaul network. Traffic which originates from or is destined to the network is routed through the backhaul network.

The backhaul network may be established with wireless communication links. Establishing a backhaul network with wireless communication links has advantages over a wired backhaul network, such as ease of deployment, low cost and flexibility to implement future changes.

In a wireless backhaul network, interference from other co-deployed networks not only affects the radio links between the nodes and WTRUs operating in the affected region, but also the links between the network nodes.

A mesh network is a network comprising a plurality of nodes, each of which is connected to at least one neighboring node such that traffic may be routed via one or more hops through the network. In the mesh network, a degradation of the link throughput between two nodes is carefully observed for routing purposes, since the throughput on a critical link could affect the overall performance of the network. The degradation can be caused by several factors, such as an increase in interference. As the degradation exceeds a certain level, an alternative routing path is allocated through the mesh network. The time-varying and dynamic nature of the mesh network topology makes it necessary to take interference into account beyond initial deployment.

For example, if a wireless backhaul network is deployed next to an existing wireless network, additional interference generated by the subsequent network can bring down some of the links in the existing network. This is a potential problem, especially in public bands such as the 2.4 GHz industrial, scientific and medical (ISM) band with scarce frequency channels.

When two mesh networks are operating simultaneously in the same proximity, one or more of the nodes of a first mesh network may roam close to a second mesh network. This may cause interruption or severe interference to the second mesh network. This is especially problematic with radio equipment having relaxed adjacent channel protection and receiver sensitivity requirements. Therefore, there is a need for dynamic radio resource management and access coordination for the radio access network.

SUMMARY

The present invention relates to a method and apparatus for managing radio resources in one or more wireless communication networks. At least one radio resource manager (RRM) is provided within a network node, or as an independent entity. The RRM monitors performance on wireless communication links of the network(s) and interacts with nodes associated with those links to change the configuration on a particular wireless communication link if its performance (i.e., quality) falls below an established threshold. Information regarding current resource usage of the network is sent to the RRM by the nodes. Each of the nodes may send a quality report to the RRM including wireless communication link quality measurements and performance statistics. Alternatively, the RRM may perform the wireless communication link quality measurements. The RRM facilitates the broadcasting of information regarding current resource usage of one network to other networks to avoid collisions and interference.

BRIEF DESCRIPTION OF THE DRAWINGS

A more detailed understanding of the invention may be had from the following description of a preferred embodiment, given by way of example and to be understood in conjunction with the accompanying drawing wherein.

DETAILED DESCRIPTION OF THE PREFERRED EMBODIMENTS

Hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "node" includes but is not limited to a Node-B, a base station, an AP, a mesh point (MP), a site controller or any other type of interfacing device in a wireless environment.

The present invention is applicable to any type of wireless communication systems including, but not limited to, IEEE 802.11, IEEE 802.15 and IEEE 802.16 networks.

In accordance with the present invention, a backhaul network is established with wireless communication links. The backhaul network may be deployed with point-to-point (PtP), PtMP or mesh topologies. Mixed-mode access networks, (e.g., IEEE 802.16 backhaul network to serve IEEE 802.11 APs), and redundant and re-configurable network functionalities are also supported.

Figure 1:
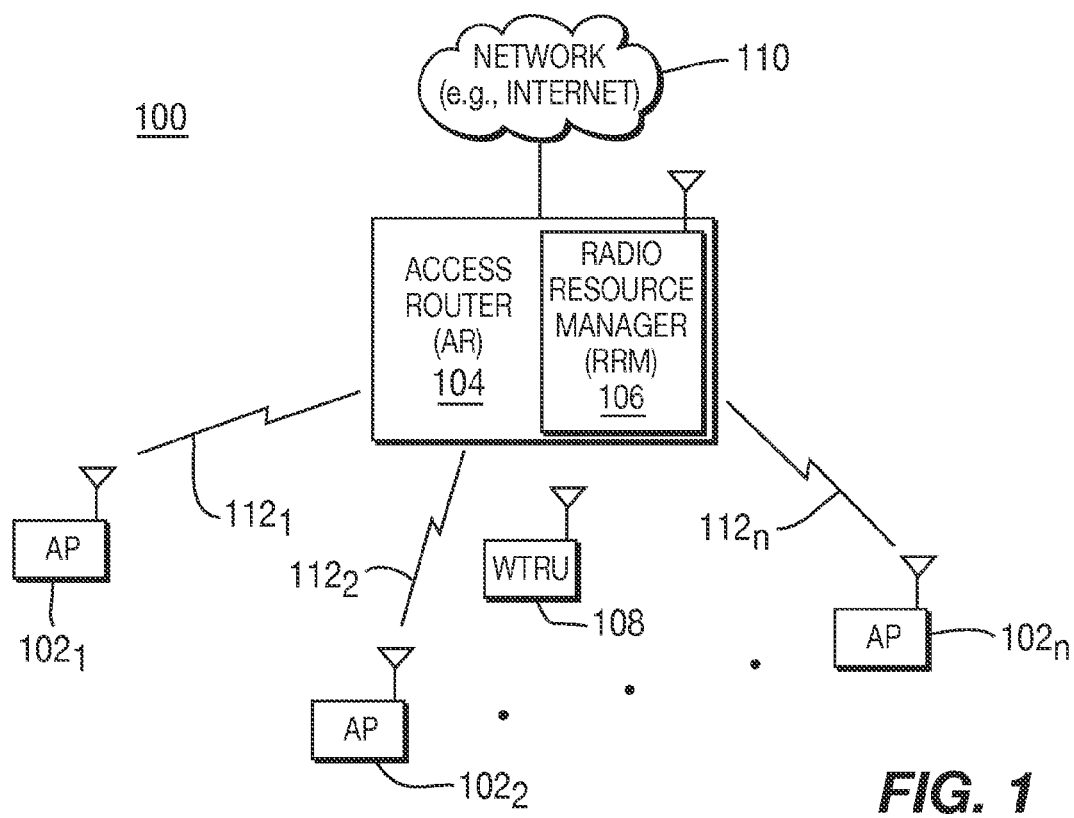
FIG. 1 shows an exemplary point-to-multipoint (PtMP) backhaul network including an RRM in accordance with one embodiment of the present invention.

FIG. 1 shows an exemplary PtMP backhaul network 100 operating in accordance with one embodiment of the present invention. The backhaul network 100 includes a plurality of APs $102_1$-$102_n$, an RRM 106 and at least one WTRU 108. The RRM 106 may reside in any node in the network 100, or be configured as a separate, independent entity. In FIG. 1, the RRM 106 is shown as being located in an access router (AR) 104 which provides access to an access network 110, such as the Internet. The RRM 106 monitors the quality of wireless backhaul links $112_1$-$112_n$ between respective ones of the APs $102_1$-$102_n$ and the AR 104. The APs $102_1$-$102_n$ may generate channel quality reports associated with wireless backhaul links $112_1$-$112_n$ which are received by the RRM 106, and/or the RRM 106 may perform quality measurements on the wireless backhaul links $112_1$-$112_n$. The quality reports include measurements and performance statistics. The performance may be evaluated with any metrics including, but not limited to, throughput, signal power, a block error rate, a bit error rate, a signal-to-interference ratio (SIR) or the like. The RRM 106 monitors performance on the wireless communication links $112_1$-$112_n$ in the backhaul network 100.

If the RRM 106 observes performance of a particular wireless backhaul link $112_1$-$112_n$ drops below a threshold, the RRM 106 dynamically interacts with other nodes in the backhaul network 100 to recover the performance. For example, the RRM 106 may change the operating frequency of the wireless communication link $112_1$. If the backhaul network 100 operates in time division multiple access (TDMA), the RRM 106 may assign and reassign timeslots as a function of interference observed in particular timeslots. If the performance degradation is caused by another network using frequency hopping which is concurrently deployed in the vicinity of the network 100, the RRM 106 may change its frequency hopping pattern to minimize mutual interference.

When the RRM 106 recognizes that a WTRU 108 is interfering with a wireless backhaul link 112 between an AP 102 and the AR 104, the RRM 106 interacts with the AP 102 to mitigate the impact of the interference caused by the WTRU 108. For example, the RRM 106 may change operating frequency or other parameters on the wireless backhaul link 112 between the AR 104 and the AP 102.

Figure 2:
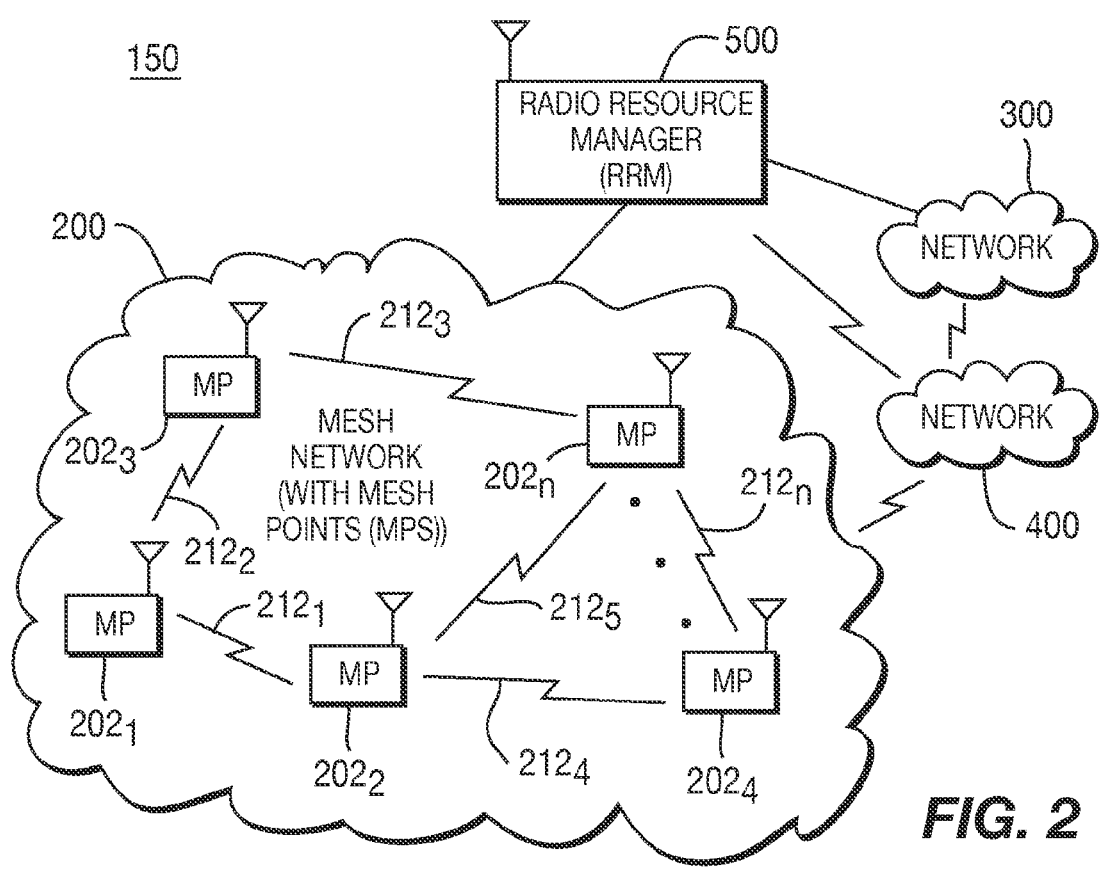
FIG. 2 shows a wireless communication system including a plurality of networks including a mesh network and an RRM operating in accordance with another embodiment of the present invention.

FIG. 2 shows a wireless communication system 150 including a plurality of networks 200, 300, 400 including at least one mesh network 200 and an RRM 500 operating in accordance with another embodiment of the present invention. The mesh network 200 includes a plurality of mesh points (MPs) $202_1$-$202_n$. Each MP $202_1$-$202_n$ is wirelessly connected to at least one neighboring MP such that traffic may be routed via one or more hops through the network 200. The RRM 500 monitors performance on the wireless communication links $212_1$-$212_n$ in the mesh network 200 and dynamically changes operating frequency or other parameters on the wireless communication links $212_1$-$212_n$ between the MPs $202_1$-$202_n$. For example, if the RRM 500 recognizes performance degradation in a particular link $212_1$-$212_n$, the RRM entity may make measurements to find an alternative frequency with lower interference and forwards this information to relevant ones of the MPs $202_1$-$202_n$ to change the operating frequency for the link $212_1$-$212_n$.

If the RRM 500 observes sudden traffic load increase between two MPs $212_1$-$212_n$, the RRM 500 may change a routing algorithm to use two different frequency channels or links, instead of just using one between these two MPs $212_1$-$212_n$ to accommodate the increased traffic or may change the backhaul route through an alternative path in the mesh network.

In accordance the present invention, the RRM 500 coordinates multiple networks 200, 300, 400 such that when two or more networks 200, 300, 400 are deployed concurrently in the same proximity, similar rules can be applied. For example, the RRM 500 receives broadcast information about current resource usage of nodes in the network 400, for instance on a broadcast channel (BCH) in the wireless backhaul. Thus, another network accesses the information when it starts up in the same proximity and configures its parameters appropriately to avoid collision with the network 400.

As shown in FIG. 2, the RRM 500 is in control of networks 200 and 300, but has no control over network 400. However, all broadcast information received from the network 400, (e.g., beacons), may be heard by a node in networks 200 and 300 and then forwarded to the RRM 500, (and the broadcast information can be heard by the RRM 500 itself, if it is a WTRU). Then, the RRM 500 would determine whether to take an action over at least one of networks 200 and 300. Thus, a high quantity of information is broadcast on the clear, (i.e., "active channel set" in beacon messages), and although a node is not part of the network that broadcasts the information, such information may be monitored to make better RRM decisions. Also, if the RRM 500 is in charge of more than one network, it can apply the same scheme to the other networks.

The broadcast information includes, but is not limited to, a timestamp reference, a service indicator, a load indicator, point coordination function (PCF) polling frequency, frequency channels in use, frequency hopping patterns or frequency assignment patterns and power settings. The broadcast of resource usage allows a concurrent network co-existing in the same proximity to schedule around it. The network may simply choose a different frequency channel to operate on.

The RRM 500 may configure one or many of the MPs $202_1$-$202_n$ in the mesh network 200 to broadcast the information in regular time intervals, or only when polled, or may send a unicast signaling message when requested or in an unsolicited manner to other nodes.

The coordination performed by the RRM may be performed in time domain, such as point coordination function (PCF)-based or hybrid coordination function (HCF)-based IEEE 802.11e extensions. For example, when first and second networks located in the same proximity have a contention free period starting at substantially the same point in time, the first network may allow the second network to initiate a polling procedure while the first network remains silent. When the second network finishes with all of its traffic, the first network may start to poll while the second network remains silent.

For example, the first network may poll its WTRUs every even 100 msec intervals, (e.g., 0 msec, 200 msec, 400 msec, 600 msec, . . . ), while the second network may use odd 100 msec intervals, (i.e., 100 msec, 300 msec, 500 msec, . . . ), to poll its WTRUs. In this way, the two networks can avoid collisions and keep mutual interference low while still operating on the same frequency. This coordination may be performed via broadcast messages or a direct signaling between the two networks, (e.g., via the RRM 500).

Polling is a coordinated process for controlling transmissions over a wireless medium, as compared to contending for the medium upon need. The HCF polls specific stations to see if they have something to transmit and then it allocates Tx time if they so request. In accordance with the present invention, coordinated polling is implemented between two HCFs. For mesh networks, most of the control is not centralized but rather distributed. Thus, two coordinated polling sequences, (i.e., from two different coordinators, or from one coordinator to two different networks), may be used to avoid interference between two networks. In this way, the two networks can avoid collisions and keep mutual interference low while still operating on the same frequency. This coordination may be performed via broadcast messages or a direct signaling between the two networks, (e.g., via the RRM 500).

As shown in FIG. 2, the present invention may be applied to multiple networks 200, 300 deployed concurrently in the same proximity, even if there is no direct communication between the networks. The networks 200, 300 may be any type of networks including networks deployed under different radio access technologies, (e.g., IEEE 802.11, IEEE 802.15, IEEE 802.16, cellular networks, or the like).

Where two or more networks 200, 300, are deployed concurrently in close proximity, the RRM 500 may run on all of the networks 200, 300. In such case, a hierarchy may be established for coordinating configuration changes of the networks 200, 300, (such as changing frequencies), where for instance backhaul links (or highly loaded links) would take precedence over lightly loaded links.

A common RRM 500 may be provided across the networks 200, 300, or a separate independent RRM 500 may be provided in each network 200, 300. For example, a common RRM 500 may be provided for IEEE 802.11 networks and IEEE 802.16 networks and for managing radio resources for the networks. The RRM 500 is not constrained to a single radio access technology, but rather it can coordinate multiple wireless networks, even if they use different radio access technologies.

Coordination may be performed across networks deployed under different radio access technologies, such as a cellular network and a wireless local area network under IEEE 802.xx standards. For example, actions may be performed by the RRM 500 to coordinate the load between two networks 200, 300, using one radio access technology and to take the redundancies of the network 400 that uses a different radio access technology into account. These actions could include for example the forcing of a change of channel, change of radio access technology, or the like, on specific WTRUs depending on the load conditions on all networks.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for managing radio resources in an Institute of Electrical and Electronics Engineers (IEEE) 802.11 access point (AP), the method comprising:
   monitoring performance of at least one wireless communication link associated with the IEEE 802.11 AP in a first wireless network;
   receiving a message including information regarding at least one wireless communication link associated with another IEEE 802.11 AP in a second wireless network;
   determining based on the reception of the message that the first wireless network is interfering with the at least one wireless communication link associated with the other IEEE 802.11 AP in the second wireless network; and
   rescheduling a time interval in the first wireless network on a condition that interference is detected in the second network.

2. The method of claim 1, further comprising:
   assigning a time interval as a function of interference observed in at least one time interval.

3. The method of claim 1, further comprising:
   rescheduling a time interval in the first wireless network as a function of interference observed in the second wireless network.

4. The method of claim 1, further comprising:
   rescheduling a time interval in the second wireless network as a function of interference observed in the first wireless network.

5. The method of claim 1, wherein the IEEE 802.11 AP is provided in the first network.

6. The method of claim 1, wherein the other IEEE 802.11 AP is provided in the second network.

7. The method of claim 1, wherein the IEEE 802.11 AP coordinates both the first network and the second network.

8. The method of claim 1, wherein the IEEE 802.11 AP coordinates a plurality of networks.

9. The method of claim 1, further comprising:
   monitoring performance of at least one wireless communication link associated with the other IEEE 802.11 AP in the second wireless network;
   determining that the second wireless network is interfering with the at least one wireless communication link associated with the IEEE 802 AP in the first wireless network; and
   rescheduling a time interval in the second wireless network on a condition that interference is detected in the first network.

10. An Institute of Electrical and Electronics Engineers (IEEE) 802 access point (AP), comprising:
    a processor configured to monitor performance of at least one wireless communication link associated with the IEEE 802.11 AP in a first wireless network;
    a receiver configured to receive a message including information regarding at least one wireless communication link associated with another IEEE 802.11 AP in a second wireless network;
    wherein the processor is further configured to determine based on the reception of the message that the first wireless network is interfering with the at least one wireless communication link associated with the other IEEE 802.11 AP in the second wireless network and reschedule a time interval in the first wireless network on a condition that interference is detected in the second network.

11. The IEEE 802.11 AP of claim 10, wherein the processor assigns a time interval as a function of interference observed in at least one time interval.

12. The IEEE 802.11 AP of claim 10, wherein the processor reschedules a time interval on the first wireless network as a function of interference observed in the second wireless network.

13. The IEEE 802.11 AP of claim 10, wherein the processor reschedules a time interval in the second wireless network as a function of interference observed in the first wireless network.

14. The IEEE 802.11 AP of claim 10, wherein the processor is configured to coordinate both the first network and the second network.

15. The IEEE 802.11 AP of claim 10, wherein the processor is configured to coordinate a plurality of networks.

16. The IEEE 802.11 AP of claim 10, wherein the processor is configured to monitor performance of at least one wireless communication link associated with the other IEEE 802.11 AP in the second wireless network;
    wherein the processor is further configured to determine that the second wireless network is interfering with the at least one wireless communication link associated with the IEEE 802.11 AP in the first wireless network and reschedule a time interval in the second wireless network on a condition that interference is detected in the first network.

* * * * *

UNITED STATES PATENT AND TRADEMARK OFFICE
CERTIFICATE OF CORRECTION

| | | |
|---|---|---|
| PATENT NO. | : 9,125,203 B2 | Page 1 of 1 |
| APPLICATION NO. | : 14/283596 | |
| DATED | : September 1, 2015 | |
| INVENTOR(S) | : Zuniga et al. | |

It is certified that error appears in the above-identified patent and that said Letters Patent is hereby corrected as shown below:

IN THE CLAIMS

In claim 10, at column 6, line 19, after the word "(IEEE)", delete "802" and insert therefor --802.11--.

Signed and Sealed this
Fifth Day of July, 2016

Michelle K. Lee
*Director of the United States Patent and Trademark Office*